US012735059B2

(12) United States Patent
Kusayanagi et al.

(10) Patent No.: US 12,735,059 B2
(45) Date of Patent: Sep. 15, 2026

(54) DRIVING SUPPORT DEVICE AND DRIVING SUPPORT METHOD

(71) Applicants: Nissan Motor Co., Ltd., Kanagawa (JP); RENAULT S.A.S., Boulogne-Billancourt (FR)

(72) Inventors: Yoshinori Kusayanagi, Kanagawa (JP); Takura Yanagi, Kanagawa (JP); Miyuki Shigeta, Kanagawa (JP); Saori Ono, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 76 days.

(21) Appl. No.: 18/681,737

(22) PCT Filed: Aug. 11, 2021

(86) PCT No.: PCT/IB2021/000530

§ 371 (c)(1),
(2) Date: Feb. 6, 2024

(87) PCT Pub. No.: WO2023/017291

PCT Pub. Date: Feb. 16, 2023

(65) Prior Publication Data

US 2024/0270268 A1 Aug. 15, 2024

(51) Int. Cl.
*B60W 50/08* (2020.01)

(52) U.S. Cl.
CPC ......... *B60W 50/08* (2013.01); *B60W 2540/21* (2020.02)

(58) Field of Classification Search
None
See application file for complete search history.

(56) References Cited

U.S. PATENT DOCUMENTS

| | | | | |
|---|---|---|---|---|
| 10,583,843 | B2 | 3/2020 | Tamagaki et al. | |
| 2018/0065664 | A1* | 3/2018 | Watanabe | B62D 15/0255 |
| 2018/0111628 | A1 | 4/2018 | Tamagaki et al. | |
| 2019/0064805 | A1* | 2/2019 | Frazzoli | G05D 1/0061 |
| 2019/0138003 | A1* | 5/2019 | Ming | G05D 1/0061 |
| 2019/0375430 | A1 | 12/2019 | Emura | |
| 2021/0300428 | A1* | 9/2021 | Stent | B60W 10/04 |
| 2021/0331709 | A1* | 10/2021 | Kim | A61B 5/1172 |

FOREIGN PATENT DOCUMENTS

| | | | |
|---|---|---|---|
| CN | 107709126 | A | 2/2018 |
| CN | 110070738 | A | 7/2019 |
| JP | 2004-291174 | A | 10/2004 |
| JP | 2018-144568 | A | 9/2018 |

(Continued)

*Primary Examiner* — Steven Lim
(74) *Attorney, Agent, or Firm* — Osha Bergman Watanabe & Burton LLP

(57) ABSTRACT

A driving support device includes a sensor configured to acquire data of a space inside a vehicle and data of a space outside the vehicle and a controller. The controller is configured to: determine whether the vehicle is in an abnormal state based on the data acquired by the sensor; upon determining that the vehicle is in the abnormal state, output a message indicating that the vehicle is in the abnormal state to a user on the vehicle; and acquire an answer from the user to the message via an input device.

9 Claims, 9 Drawing Sheets

(56) References Cited

FOREIGN PATENT DOCUMENTS

| | | | | |
|---|---|---|---|---|
| JP | 2018-144569 | A | 9/2018 | |
| JP | 2018-144570 | A | 9/2018 | |
| JP | 2018-147111 | A | 9/2018 | |
| JP | 6480143 | B2 | 3/2019 | |
| JP | 2019-116185 | A | 7/2019 | |
| WO | 2009/107185 | A1 | 9/2009 | |
| WO | WO-2020213772 | A1 * | 10/2020 | ........... A61B 5/6893 |

* cited by examiner

Figure 1:
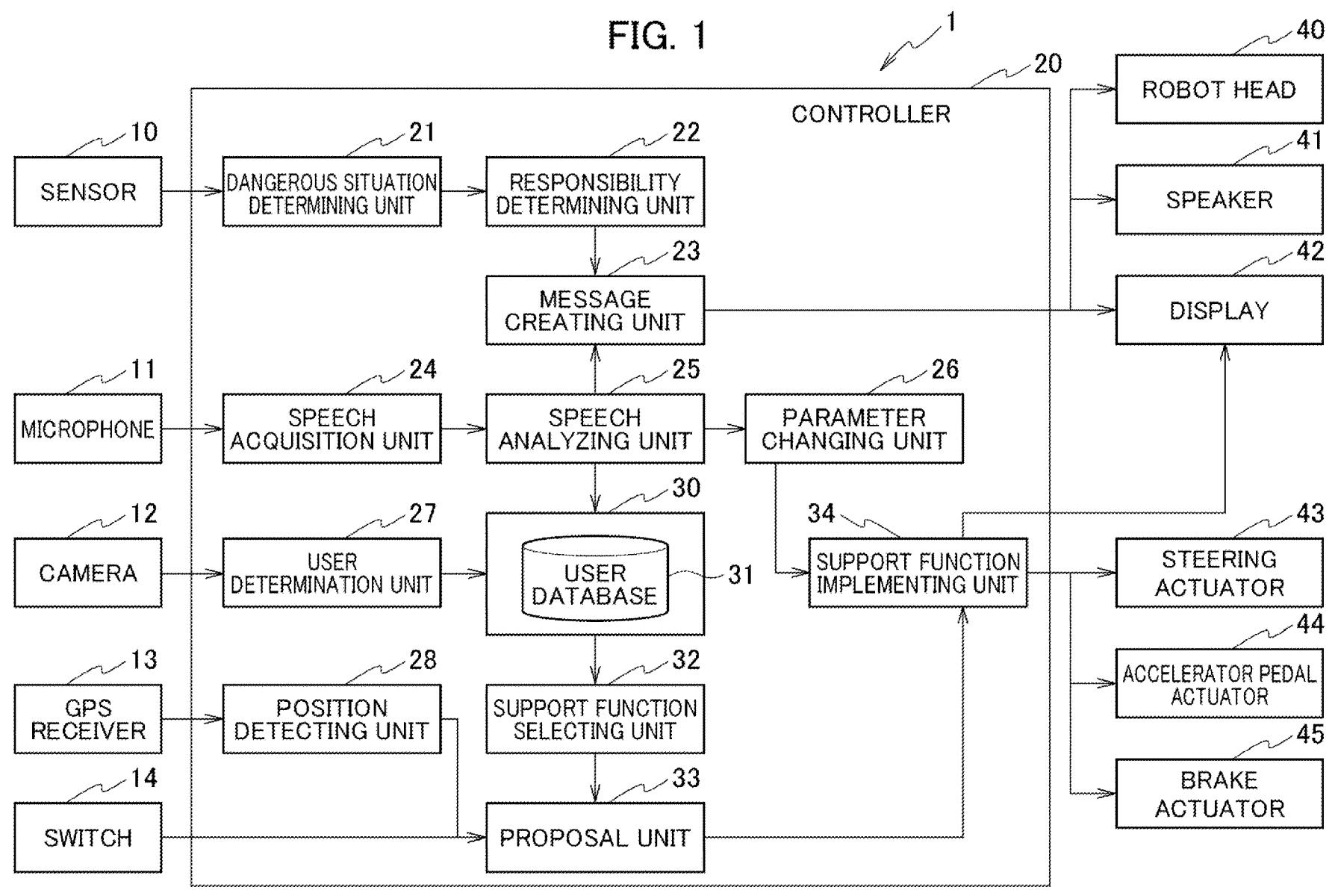

20 CONTROLLER

10 SENSOR
11 MICROPHONE
12 CAMERA
13 GPS RECEIVER
14 SWITCH

21 DANGEROUS SITUATION DETERMINING UNIT
22 RESPONSIBILITY DETERMINING UNIT
23 MESSAGE CREATING UNIT
24 SPEECH ACQUISITION UNIT
25 SPEECH ANALYZING UNIT
26 PARAMETER CHANGING UNIT
27 USER DETERMINATION UNIT
28 POSITION DETECTING UNIT
30
31 USER DATABASE
32 SUPPORT FUNCTION SELECTING UNIT
33 PROPOSAL UNIT
34 SUPPORT FUNCTION IMPLEMENTING UNIT

40 ROBOT HEAD
41 SPEAKER
42 DISPLAY
43 STEERING ACTUATOR
44 ACCELERATOR PEDAL ACTUATOR
45 BRAKE ACTUATOR

FIG. 3

| SCENE | DETERMINATION EXAMPLE | PROPOSED SUPPORT FUNCTION |
|---|---|---|
| PARKING | DISTANCE FROM OBSTACLE IS 15 cm OR SHORTER<br>THE NUMBER OF QUICK TURNS OF STEERING WHEEL TO MOVE BACK AND FORTH IS FIVE TIMES OR MORE | AVM<br>AUTOMATIC PARKING |
| NARROW ROAD | DISTANCE FROM OBSTACLE ON LEFT SIDE IS 15 cm OR SHORTER | SIDE-DOWN-VIEW MONITOR<br>STEERING SUPPORT |
| APPROACH TO PRECEDING VEHICLE | SPEED IS 15 km/h OR HIGHER, AND DISTANCE FROM PRECEDING VEHICLE IS 5 m OR SHORTER | EMERGENCY STOP BRAKE<br>EMERGENCY AVOIDANCE STEERING |
| LANE DEVIATION | DISTANCE FROM ROAD DIVISION LINE IS 5 cm OR SHORTER | LANE DEVIATION PREVENTION |
| MERGING OR LANE CHANGE | DISTANCE FROM REAR LATERAL SIDE VEHICLES IS 5 m OR SHORTER, AND VEHICLE IS STEERED IN THE DIRECTION | BLIND SPOT WARNING<br>STEERING SUPPORT |
| RIGHT TURN | TTC WITH ONCOMING VEHICLE THAT TRAVELS STRAIGHT AHEAD IS PRESCRIBED VALUE OR LESS | EMERGENCY STOP BRAKE |
| LEFT TURN | DISTANCE FROM OBSTACLE ON LEFT SIDE IS 15 cm OR SHORTER | AVM + ULTRASONIC SENSOR |

FIG. 4

| USER | DATE AND TIME | LOCATION (COORDINATES) | SCENE | SUPPORT FUNCTION |
|---|---|---|---|---|
| 51 | MARCH 25, 2020 (WEDNESDAY) 13:35 | X1<br>Y1 | PARKING SPACE | AUTOMATIC PARKING |
| | MARCH 25, 2020 (WEDNESDAY) 15:50 | X2<br>Y2 | NARROW ROAD WITH WIDTH OF 3.5 m OR LESS | AVM NARROW ROAD SUPPORT |
| | MARCH 29, 2020 (SUNDAY) 10:13 | X3<br>Y3 | HIGHWAY | AUTOMATIC DRIVING |
| | ..... | ..... | ..... | ..... |
| 52 | DECEMBER 31, 2019 (TUESDAY) 23:55 | X4<br>Y4 | INTERSECTION | EMERGENCY STOP BRAKE |
| | ..... | ..... | ..... | ..... |

FIG. 5

| WHO IS RESPONSIBLE? | MESSAGE EXAMPLE 1 | MESSAGE EXAMPLE 2 |
| --- | --- | --- |
| USER | "SOMETHING HAPPENED?"<br>"WHAT HAPPENED?"<br>"WHAT IS THE MATTER?"<br>"DID YOU DO SOMETHING?"<br>"WHAT DID YOU DO?" | "WHOSE FAULT IS IT?"<br>"WHO IS RESPONSIBLE FOR THIS?" |
| HOST-VEHICLE | "DID YOU FEEL UNSAFE?"<br>"WAS DRIVING DANGEROUS?"<br>"WERE YOU SCARED?" | "WAS BRAKE APPLIED TOO LATE?"<br>"WAS DISTANCE FROM ANOTHER VEHICLE TOO SHORT?"<br>"WAS PRECEDING VEHICLE TOO CLOSE?"<br>"WAS ACCELERATOR PRESSED TOO MUCH?"<br>"TOO FAST?"<br>"TOO SLOW?"<br>"WAS STEERING WHEEL TURNED TOO LATE/TOO EARLY?"<br>"WAS VEHICLE POSITIONED TOO CLOSE TO RIGHT/LEFT?"<br>"DID VEHICLE SWAY?"<br>"WAS VEHICLE IN JERKY MOTION?" |
| ANOTHER PERSON (ANOTHER VEHICLE) | "WERE YOU OK?" | |

DRIVING SUPPORT DEVICE AND DRIVING SUPPORT METHOD

TECHNICAL FIELD

The present invention relates to a driving support device and a driving support method.

BACKGROUND ART

There is a prior known invention for detecting dangerous driving performed by a user and presenting driving characteristics to the user (Patent Literature 1).

CITATION LIST

Patent Literature

Patent Literature 1: Japanese Patent No. 6480143

SUMMARY OF INVENTION

Technical Problem

However, in the invention disclosed in Patent Literature 1, a system determines whether driving is dangerous driving. A user himself/herself determines whether to admit the determination result. Therefore, driving support based on the determination result may not be effective.

The present invention has been made in view of the above problem, and an object of the present invention is to provide a driving support device and a driving support method capable of providing driving support suitable for a user's feeling.

Solution to Problem

A driving support device 1 according to an aspect of the present invention determines whether a vehicle is in an abnormal state based on data acquired by a sensor, upon determining that the vehicle is in the abnormal state, outputs a message indicating that the vehicle is in the abnormal state to a user on the vehicle, and acquires an answer from the user to the message via an input device.

Advantageous Effects

According to the present invention, it is possible to provide driving support suitable for a user's feeling.

BRIEF DESCRIPTION OF DRAWINGS

FIG. 1 is a diagram showing a configuration of a driving support device 1 according to an embodiment of the present invention.

FIG. 3 is an example of a method for determining dangerous driving.

FIG. 4 is an example of data stored when a support function is implemented.

FIG. 5 is an example of messages output from the robot head 40.

DESCRIPTION OF EMBODIMENTS

Figure 2:
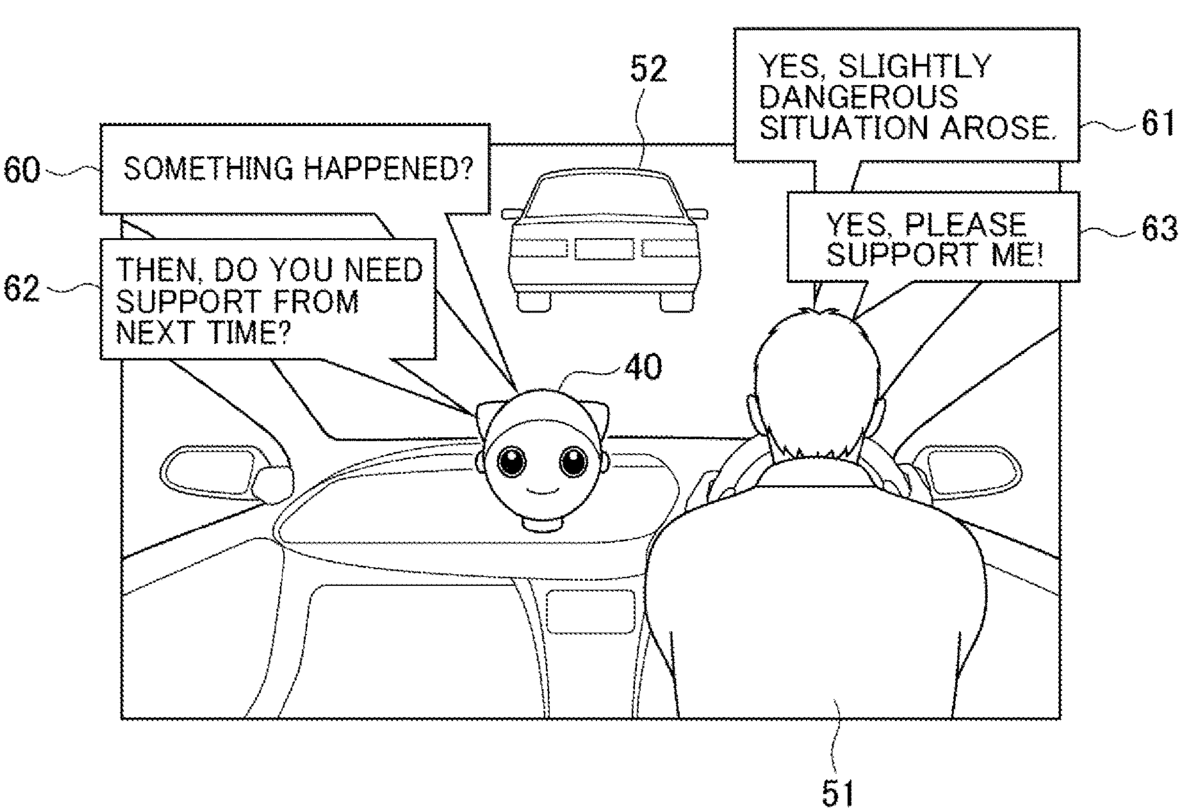
FIG. 2 shows conversations made between a user 51 and a robot head 40.

An embodiment of the present invention will be described below with reference to the drawings. In the description of the drawings, the same parts are denoted by the same reference numerals and the explanation thereof will be omitted.

An example of a configuration of a driving support device 1 will be described with reference to FIG. 1. As shown in FIG. 1, the driving support device 1 includes a sensor 10, a microphone 11, a camera 12, a GPS receiver 13, a switch 14, a controller 20, a robot head 40, a speaker 41, a display 42, a steering actuator 43, an accelerator pedal actuator 44, and a brake actuator 45.

The driving support device 1 is mounted on a vehicle having automatic driving functions. The driving support device 1 may be mounted on a vehicle that can switch between automatic driving and manual driving. As an example, the automatic driving functions perform automatic control such as steering control, braking force control, and driving force control and support driving of a user. In the present embodiment, a "user" means a user who is sitting in a driver's seat of a vehicle.

The sensor 10 is used to acquire various pieces of data and information. Examples of the sensor 10 include a sensor for acquiring data of a vehicle and a sensor for acquiring vehicle external information. An example of the data of a vehicle is the speed, acceleration, steering angle, brake hydraulic pressure, and accelerator opening. Examples of sensors that acquire these pieces of data include speed sensors, acceleration sensors, steering angle sensors, gyro sensors, brake hydraulic pressure sensors, and accelerator opening sensors.

Examples of the vehicle external information include an object (a pedestrian, bicycle, motorcycle, another vehicle, and the like) present in a periphery of a vehicle (host-vehicle), a traffic light, road division line, sign, pedestrian crosswalk, intersection, and the like. Examples of the sensor for acquiring these pieces of information include a laser range finder, radar, lidar, the camera 12, a sonar, and the like. In the present embodiment, the sensor 10 is distinguished form the camera 12 for convenience of explanation, but the camera 12 is a type of the sensor 10. The data and information acquired by the sensor 10 are output to the controller 20.

The microphone 11 acquires voice data of the user. The voice data acquired by the microphone 11 is output to the controller 20.

The camera 12 has an imaging element such as a charge-coupled device (CCD) or a complementary metal oxide semiconductor (CMOS). The installation position of the camera 12 is not particularly limited, but as an example, the camera 12 is installed in the front, sides, or rear of a vehicle. The camera 12 captures an image of a space around the vehicle. The image data captured by using the camera 12 is output to the controller 20. Further, in the present embodiment, the camera 12 is also installed inside a vehicle. For example, the camera 12 is installed near a driver's seat to capture an image the user's face. The face image data captured by using the camera 12 is output to the controller 20.

The GPS receiver 13 detects position information of a vehicle on the ground by receiving radio waves from an artificial satellite. The position information of the vehicle detected by the GPS receiver 13 includes latitude information and longitude information. The GPS receiver 13 outputs the detected position information of the vehicle to the controller 20. An entity performing the method for detecting the position information of the vehicle is not limited to the GPS receiver 13. For example, the position of the vehicle may be estimated using a method called an odometry. The odometry is a method for estimating a position of a vehicle by obtaining the amount of movement and a movement direction of the vehicle in accordance with a rotation angle and a rotation angular speed of the vehicle. A GNSS receiver may be used instead of the GPS receiver 13.

The switch 14 is used when the user uses support functions. When the user presses the switch 14, the support functions are activated. The "support functions" in the present embodiment include an around-view monitor (hereinafter referred to as an AVM), automatic parking, a side-down-view monitor, steering support, emergency stop brake, emergency avoidance steering, lane deviation prevention, blind spot warning, a combination of an AVM and an ultrasonic sensor, and the like. Since the support functions are well known, a detailed description thereof will be omitted. The switch 14 may be a physical switch or a virtual switch. The virtual switch is, for example, a switch displayed on the display 42. Some of the support functions described above are also the automatic driving functions. That is, the support functions of the present embodiment include the automatic driving functions. The automatic driving functions include adaptive cruise control (ACC), constant speed control, and the like.

The controller 20 is a general-purpose microcomputer that includes a central processing unit (CPU), a memory, and an input/output unit. A computer program for causing the microcomputer to function as the driving support device 1 is installed in the microcomputer. By executing the computer program, the microcomputer functions as a plurality of information processing circuits in the driving support device 1. Here, an example of realizing the plurality of information processing circuits in the driving support device 1 by software is shown. However, it is also possible to configure each information processing circuit by preparing dedicated hardware for performing each information processing described below. Further, the plurality of information processing circuits may be configured by individual pieces of hardware. As an example of the plurality of information processing circuits, the controller 20 includes a dangerous situation determining unit 21, a responsibility determining unit 22, a message creating unit 23, a speech acquisition unit 24, a speech analyzing unit 25, a parameter changing unit 26, a user determination unit 27, a position detecting unit 28, a support function selecting unit 32, a proposal unit 33, and a support function implementing unit 34.

The robot head 40 is a figurine imitating a head of a robot. The robot head 40 is installed to enhance the affinity between a user and a vehicle. The robot head 40 has a speaker function and an information processing function.

Next, with reference to FIGS. 2 to 7, the details of the dangerous situation determining unit 21, the responsibility determining unit 22, the message creating unit 23, the speech acquisition unit 24, the speech analyzing unit 25, the parameter changing unit 26, the user determination unit 27, the position detecting unit 28, the support function selecting unit 32, the proposal unit 33, and the support function implementing unit 34 will be described.

FIG. 2 shows a scene in which a user 51 is having conversations with the robot head 40. The conversations are indicated by reference numerals 60 to 63. Reference numerals 60 and 62 indicate the speech made by the robot head 40. Reference numerals 61 and 63 indicate the speech made by the user 51. The flow of the conversations is in the order of reference numerals 60, 61, 62, and 63. Reference numeral 52 indicates a preceding vehicle. Although a description will be given by assuming that all of reference numerals 60 to 63 indicate voice, the present invention is not limited thereto. For example, contents indicated by reference numerals 60 and 62 may be displayed on the display 42 as characters. Further, reference numerals 61 and 63 may indicate information selected by the user 51 from a plurality of options. In this case, the plurality of options are displayed on the display 42. First, conditions for outputting voice "Something happened?" indicated by reference numeral 60 will be described. The installation of the robot head 40 is not essential. A virtual robot head may be displayed on the display 42.

The dangerous situation determining unit 21 determines whether the user 51 drove dangerously using data acquired from the sensor 10. An example of the determination method will be described with reference to FIG. 3. The scene shown in FIG. 3 is classified into parking, a narrow road, approach to a preceding vehicle, lane deviation, merging or lane change, a right turn, and a left turn. In the scene of "parking", if a distance from an obstacle is 15 cm or shorter, or the number of times a steering wheel is quickly turned to move the vehicle back and forth is five times or more, the dangerous situation determining unit 21 determines that the user 51 drove dangerously. A distance from an obstacle is detected by a lidar. The number of times a steering wheel is quickly turned is detected by a steering angle sensor. In the scene of "narrow road", if a distance from an obstacle on the left side is 15 cm or shorter, the dangerous situation determining unit 21 determines that the user 51 drove dangerously. Here, the determination is made based on the Japanese traffic rules (left-hand traffic). The term "left" or "right" can be appropriately replaced according to the traffic rules of each country.

In the scene of "approach to a preceding vehicle", if the speed of the host-vehicle is 15 km/h or higher, and a distance from a preceding vehicle is 5 m or shorter, the dangerous situation determining unit 21 determines that the user 51 drove dangerously. The speed of the host-vehicle is detected by the speed sensor. The distance from the preceding vehicle is detected by the lidar. In the scene of "lane deviation", if a distance from either one of left and right road division lines is 5 cm or shorter, the dangerous situation determining unit 21 determines that the user 51 drove dangerously. A distance from a road division line is detected by the camera 12. In the scene of "merging or lane change", if the distance from rear lateral side vehicles is 5 m or shorter, and the host-vehicle is steered in the directions, the dangerous situation determining unit 21 determines that the user 51 drove dangerously. The distance from the rear lateral side vehicles is detected by the lidar. The steering direction is detected by the steering angle sensor. In the scene of "right turn", if time to collision (TTC) with an oncoming vehicle that travels straight ahead is equal to or less than a prescribed value, the dangerous situation determining unit 21 determines that the user 51 drove dangerously. The TTC with the oncoming vehicle that travels straight ahead is calculated using the speed of the oncoming vehicle that travels straight ahead and the distance to the oncoming vehicle that travels straight ahead. In the scene of "left turn", if a distance from an obstacle on the left side is 15 cm or shorter, the dangerous situation determining unit 21 determines that the user 51 drove dangerously.

If the dangerous situation determining unit 21 determines that the user 51 drove dangerously, a signal indicating the determination result is transmitted to the responsibility determining unit 22. The responsibility determining unit 22, that has received the signal, determines who is responsible for dangerous driving. In the scene of FIG. 3, the responsibility determining unit 22 determines that the user 51 is responsible for dangerous driving. In this case, a signal indicating the determination result is transmitted to the message creating unit 23. The message creating unit 23, which has received the signal, creates a message which is indicated by reference numeral 60. The message creating unit 23 outputs the created message to the robot head 40. Accordingly, as shown in FIG. 2, the message indicated by reference numeral 60 is output with voice. As shown in FIG. 2, in response to the question "Something happened?", the user 51 answers "Yes, a slightly dangerous situation arose!" (reference numeral 61). This answer is a positive answer. The "positive answer" here means an answer in which the user 51 admits that his/her driving was dangerous.

The voice answer made by the user 51 is output to the speech acquisition unit 24 by using the microphone 11. The speech acquisition unit 24 outputs the voice data of the user 51 to the speech analyzing unit 25. The speech analyzing unit 25 analyzes the voice data of the user 51. A well-known technique is used for the voice analysis method. The speech analyzing unit 25 determines whether the answer made by the user 51 is positive, based on the analysis result. A signal indicating the determination result is output to the message creating unit 23. The message creating unit 23, which has received the signal, creates a message (Then, do you need support from next time?) indicated by reference numeral 62. The message indicated by reference numeral 62 is created because the answer made by the user 51 is positive. As shown in FIG. 2, in response to the question "Then, do you need support from next time?", the user 51 answers "Yes, please support me!" (reference numeral 63). This answer is a positive answer. The "positive answer" here means an answer in which the user accepts a support function. The answer indicated by reference numeral 63 is also analyzed by the speech analyzing unit 25 in the same manner as the answer indicated by reference numeral 61. Then, the speech analyzing unit 25 determines whether the answer made by the user 51 is positive. A signal indicating the determination result is output to a user database 31. The user database 31 is stored in a storage device 30. The storage device 30 is constituted by hard disk drive (HDD), solid state drive (SSD), and the like.

If it is determined that the user 51 drove dangerously, the position detecting unit 28 detects a position (location) of the vehicle at that time using data acquired from the GPS receiver 13. The detected position information is stored in the user database 31.

The "support function" in the present embodiment is implemented the next time when the user 51 drives a vehicle after the messages indicated by reference numerals 60 to 63 have been exchanged. When the user 51 gets on a vehicle, the camera 12 captures an image of the face of the user 51. The face image data captured by using the camera 12 is output to the user determination unit 27. The user determination unit 27 compares the face image data acquired from the camera 12 with face image data stored in advance in the user database 31 and specifies the user who has gotten on the vehicle. In the present embodiment, the user who has gotten on the vehicle is specified as the user 51. The reason why it is necessary to specify a user is to provide support suitable for the user. There is a case where one vehicle is shared by multiple users. In this case, it is necessary to specify the user who has gotten on the vehicle in order to provide support suitable for the user. If support is provided without specifying the user, the user may feel uncomfortable.

The support function selecting unit 32 selects support suitable for a scene from among the plurality of support functions. As shown in FIG. 3, when a scene is "parking", the support function selecting unit 32 selects an AVM or automatic parking from among the plurality of support functions. Note that, the support function selecting unit 32 may select the AVM and automatic parking. When a scene is a "narrow road", the support function selecting unit 32 selects a side-down-view monitor or steering support from among the plurality of support functions. When a scene is "approach to a preceding vehicle", the support function selecting unit 32 selects an emergency stop brake or emergency avoidance steering from among the plurality of support functions. When a scene is a "lane deviation", the support function selecting unit 32 selects lane deviation prevention from among the plurality of support functions. When a scene is a "merging or lane change", the support function selecting unit 32 selects a blind spot warning or steering support from among the plurality of support functions. When a scene is a "right turn", the support function selecting unit 32 selects an emergency stop brake from among the plurality of support functions. When a scene is a "left turn", the support function selecting unit 32 selects a combination of an AVM and an ultrasonic sensor from among the plurality of support functions.

Here, support when a scene is "parking" will be described. A location when the unit determined last time that the user 51 drove dangerously will be referred to as a parking space A. Is is assumed that the user 51 goes to the parking space A again. The proposal unit 33 determines that the vehicle is in the parking space A, based on position information acquired from the position detecting unit 28. In the exchange of the messages (exchange of the messages indicated by reference numerals 60 to 63) made last time, the user 51 has accepted a support function. The acceptance result is recorded in the user database 31. The support function selecting unit 32 selects a support function to be proposed to the user 51 by referring to the user database 31. Here, it is assumed that automatic parking is selected. The support function selecting unit 32 outputs the selection result to the proposal unit 33. The proposal unit 33 confirms to the user 51 whether to implement the support function. The reason why the unit confirms to the user whether to implement the support function again is to enhance the trust relationship between the user 51 and the vehicle. This confirmation may be made with voice using the speaker 41 or made by displaying characters on the display 42. The user 51 answers to the confirmation by using the switch 14. If the user 51 presses the switch 14, it means that the user has accepted the support function. After receiving a signal indicating that the switch 14 is in an on state, the proposal unit 33 outputs an instruction for implementing the support function to the support function implementing unit 34. The support function implementing unit 34, which has received the instruction, controls the steering actuator 43, the accelerator pedal actuator 44, and the brake actuator 45. This performs automatic parking.

When the support function is implemented, the data at that time is recorded in the user database 31. As shown in FIG.

4, the recorded data is the user names, date and time, locations, scenes, and implemented support functions.

Although a description has be given by assuming that the message creating unit 23 creates the messages 60 and 62 and outputs the messages to the robot head 40, the present invention is not limited thereto. These kinds of messages may be created in advance. It is sufficient if the messages created in advance are stored in the storage device 30. By referring to the storage device 30, the message creating unit 23 can output appropriate messages to the robot head 40. FIG. 5 shows examples of messages created in advance. If the user 51 is responsible for dangerous driving, examples of messages selected by the message creating unit 23 include a message "Something happened?", a message "What happened?", a message "What is the matter?", a message "Did you do something?", and a message "What did you do?". The message examples 1 is intended to indirectly cause the user 51 to admit the responsibility. Meanwhile, the message example 2 of FIG. 5 is intended to specifically prompt the user 51 to answer. Examples of the message example 2 include, a message "Whose fault is it?" and a message "Who is responsible for this?" as shown in FIG. 5.

Figure 6:
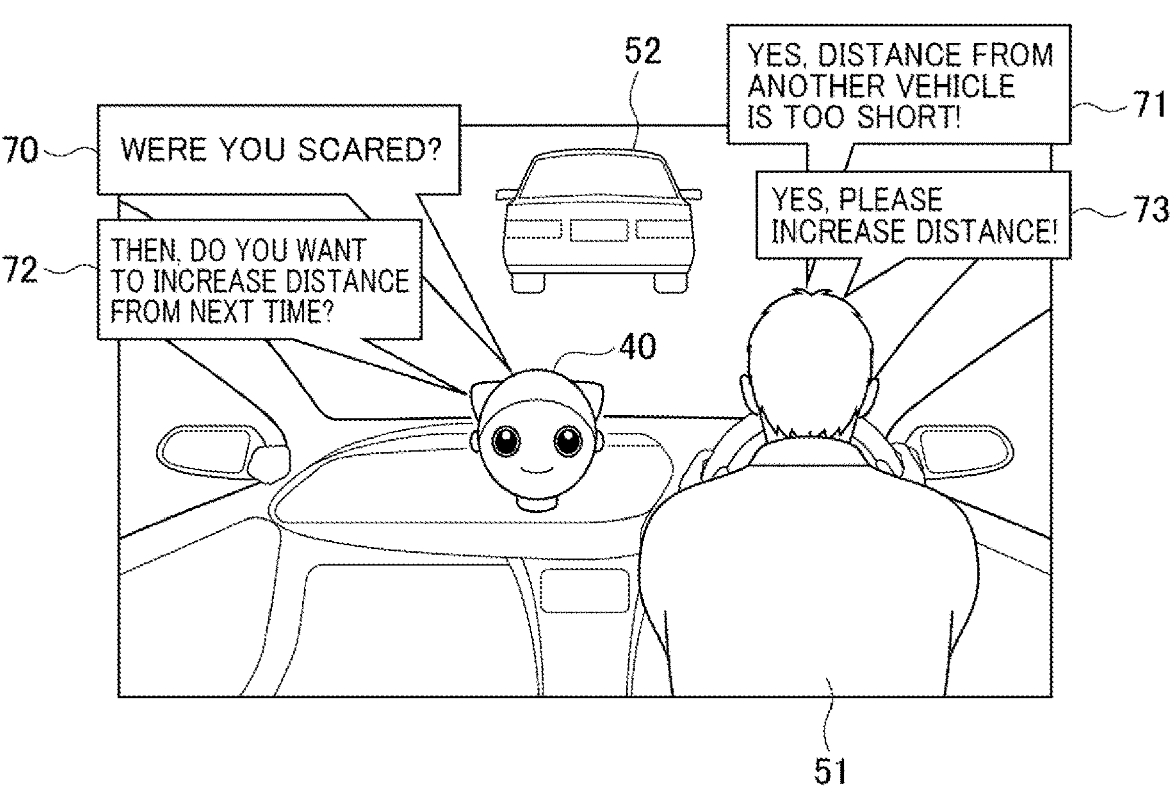
FIG. 6 shows conversations made between the user 51 and the robot head 40.

In the above example, it is determined that the user 51 drove dangerously. Here, an entity driving the vehicle is not only the user 51. Since the vehicle has automatic driving functions, driving without the intervention of the user 51 (automatic driving) is also performed. Normally, automatic driving is designed to prevent dangerous driving. However, due to unexpected factors, some sort of abnormality may occur in automatic driving. Here, the "abnormality" means a state which is not normal. The "abnormality" is a concept that includes not only a malfunction that prevents automatic driving from exhibiting original functions thereof, but also a failure that is not as severe as a malfunction and a warning sign of a malfunction. If an abnormality occurs in automatic driving, there is a possibility that the dangerous situations shown in the determination example in FIG. 3 may arise. A conversation example when an abnormality occurs in automatic driving will be described with reference to FIG. 6. FIG. 6 shows a scene in which the user 51 is having conversations with the robot head 40. The conversations are indicated by reference numerals 70 to 73. Reference numerals 70 and 72 indicate the speech made by the robot head 40. Reference numerals 71 and 73 indicate the speech made by the user 51. The flow of the conversations is in the order of reference numerals 70, 71, 72, and 73. The conditions for outputting a message "Were you scared?" indicated by reference numeral 70 will be described below.

If the dangerous situation determining unit 21 determines that an abnormality has occurred in automatic driving, a signal indicating the determination result is transmitted to the responsibility determining unit 22. The responsibility determining unit 22, which has received the signal, determines who is responsible for dangerous driving. Here, the responsibility determining unit 22 determines that automatic driving (vehicle) is responsible for dangerous driving. A signal indicating the determination result is transmitted to the message creating unit 23. The message creating unit 23, which has received the signal, creates the message indicated by reference numeral 70. The message creating unit 23 outputs the created message to the robot head 40. As a result, the message indicated by reference numeral 70 is output with voice as shown in FIG. 6. As shown in FIG. 6, in response to the question "Were you scared?", the user 51 answers "Yes, a distance from another vehicle is too short!" (reference numeral 71). This answer is a positive answer. Here, the "positive answer" means an answer in which the user 51 admits that automatic driving has been dangerous driving. The answer made by the user 51 is analyzed based on the same method described above. Based on the analysis result, the message creating unit 23 creates a message (Then, do you want to increase the distance from next time?) indicated by reference numeral 72. The message indicated by reference numeral 72 is created, because the answer made by the user 51 has been positive. As shown in FIG. 6, in response to the question "Then, do you want to increase the distance from next time?", the user 51 answers "Yes, please increase the distance!" (reference numeral 73). This answer is a positive answer. Here, the "positive answer" is an answer for changing a parameter of a support function (automatic driving function). The answer indicated by reference numeral 73 is analyzed by the speech analyzing unit 25. Then, it is determined whether the answer made by the user 51 is positive. A signal indicating the determination result is output to the parameter changing unit 26. Next time, when automatic driving is performed, the parameter changing unit 26 changes a distance from another vehicle such that the distance becomes longer compared with that in previous automatic driving. The changed parameter is output to the support function implementing unit 34. The support function implementing unit 34 controls the distance from another vehicle based on the changed parameter. As a result, it is possible to perform driving support suitable for a user's feeling.

The messages indicated by reference numerals 70 and 72 may also be created in advance in the same manner as the messages indicated by reference numerals 60 and 62. When automatic driving (the vehicle) is responsible for dangerous driving, examples of messages selected by the message creating unit 23 include a message "Did you feel unsafe?", a message "Was the driving dangerous?", and a message "Were you scared?" as shown in FIG. 5. Examples of other messages include a message "Was a brake applied too late?", a message "Was a distance from another vehicle too short?", a message "Was a preceding vehicle too close?", a message "Was an accelerator pressed too much?", a message "Too fast?", a message "Too slow?", a message "Was a steering wheel turned too late/too fast?", a message "Was the vehicle positioned too close to the right/left?", a message "Did vehicle sway?", and a message "Was vehicle in a jerky motion?".

Figure 7:
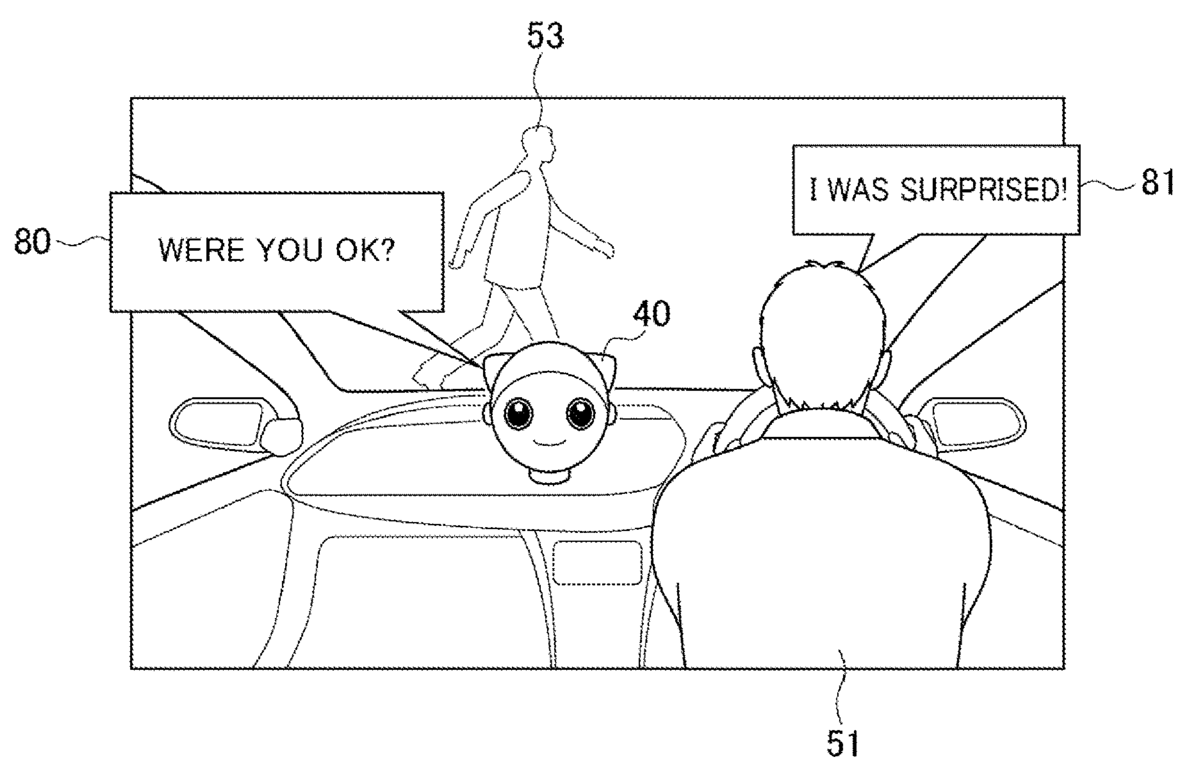
FIG. 7 shows conversations made between the user 51 and the robot head 40.

A cause of occurrence of a dangerous situation is not limited to driving by the user 51 or automatic driving. For example, a cause may be driving by a user in another vehicle, automatic driving of another vehicle, a pedestrian, or the like. FIG. 7 shows a scene in which a dangerous situation arose due to a pedestrian 53 dashing out. Reference numeral 80 indicates a speech made by the robot head 40. Reference numeral 81 indicates a speech made by the user 51. The flow of conversations is in the order of reference numerals 80 and 81. When a dangerous situation arises due to dashing out of the pedestrian 53, the message creating unit 23 creates a message (Were you OK?) indicated by reference numeral 80 and outputs the message to the robot head 40.

Figure 8:
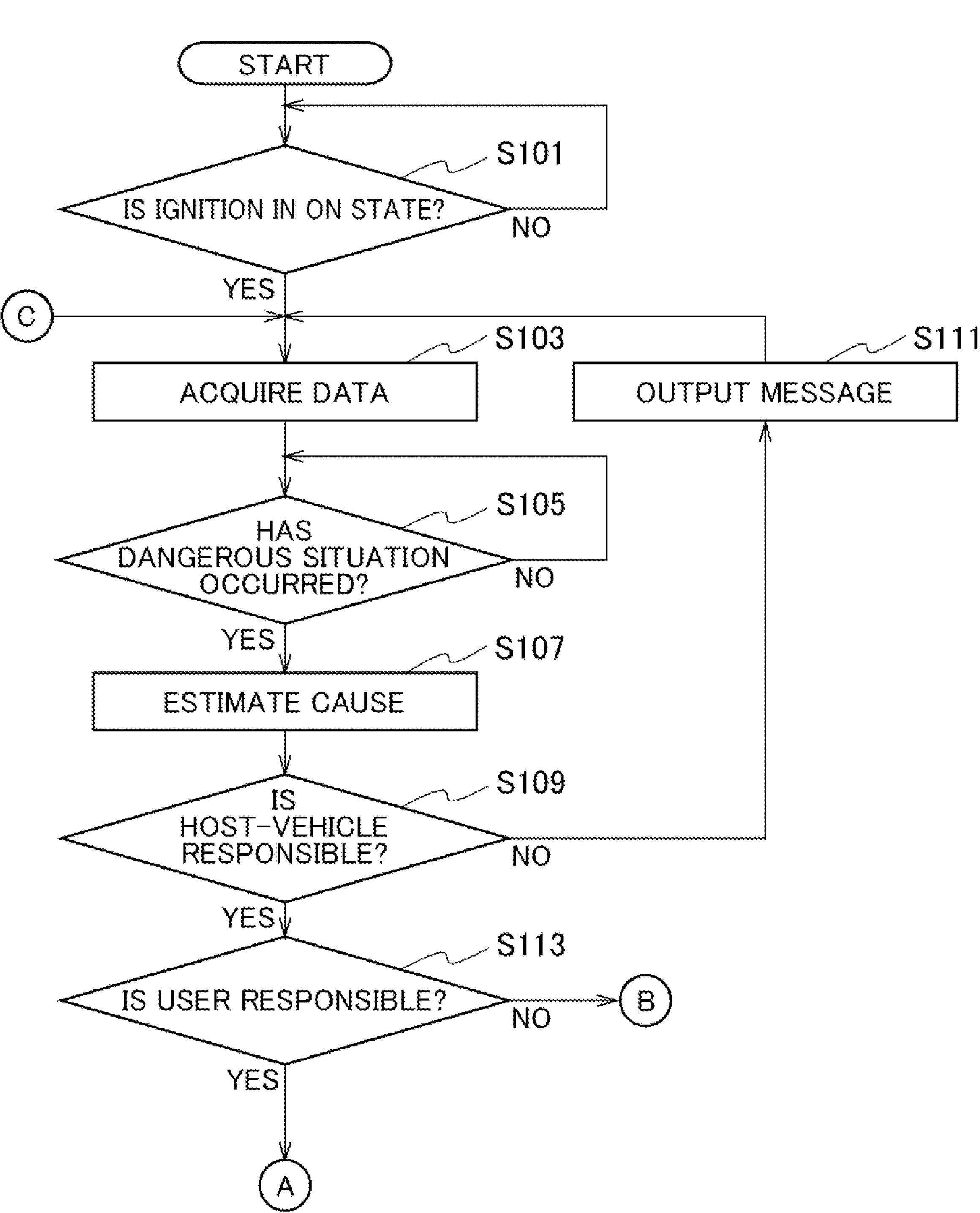
FIG. 8 is a flowchart for explaining an operation example of the driving support device 1.
Figure 9:
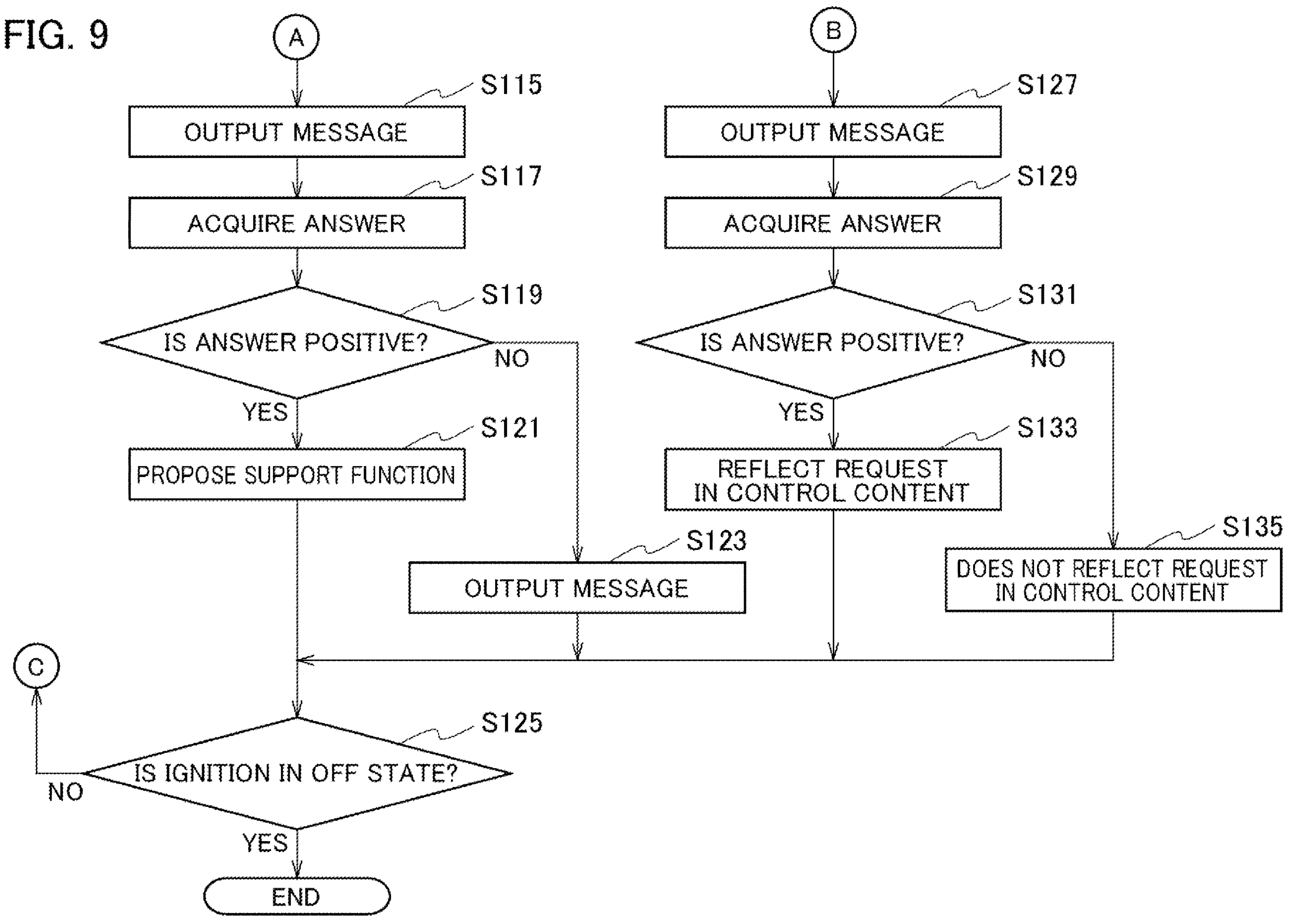
FIG. 9 is a flowchart for explaining an operation example of the driving support device 1.

Next, an operation example of the driving support device 1 will be described with reference to the flowchart of FIGS. 8 and 9.

When an ignition is in an on state (YES in step S101), processing proceeds to step S103. The information that "the ignition is in an on state" means that a power supply of the vehicle is turned on. In steps S103 and S105, the dangerous situation determining unit 21 determines whether a dangerous situation has occurred using data acquired from the sensor 10. If a dangerous situation has occurred (YES in step S105), the processing proceeds to step S107. In step S107, the responsibility determining unit 22 estimates a cause of occurrence of the dangerous situation, based on the data acquired from the sensor 10. For example, if the dangerous situations shown in FIG. 3 occur due to driving by the user 51, it is estimated that the user 51 is responsible for dangerous driving (YES in step S113). If the dangerous situations shown in FIG. 3 occur due to automatic driving functions of the host-vehicle, it is estimated that automatic driving (vehicle) is responsible for dangerous driving (NO in step S113). If a dangerous situation occurs due to driving by a user in another vehicle, automatic driving functions of another vehicle, or a pedestrian and the like, it is estimated that a user of another vehicle, another vehicle, or a pedestrian and the like is responsible for dangerous driving (NO in step S109). The "pedestrian and the like" includes a pedestrian, a bicycle, and a motorcycle.

In step S111, the message indicated by reference numeral 80 is output (see FIG. 7). In step S115, the message indicated by reference numeral 60 is output (see FIG. 2). The processing proceeds to step S117, and the speech acquisition unit 24 acquires an answer made by the user 51 using the microphone 11. If an answer made by the user 51 is determined to be positive (YES in step S119), the message indicated by reference numeral 62 for proposing a support functions is output (see FIG. 2). If an answer by made the user 51 is determined to be negative (NO in step S119), a message indicating that the user 51 is responsible for dangerous driving is output.

In step S127, the message indicated by reference numeral 70 is output (see FIG. 6). The processing proceeds to step S129, and the speech acquisition unit 24 acquires an answer made by the user 51 using the microphone 11. If an answer made by the user 51 is determined to be positive (YES in step S131), the parameter changing unit 26 reflects a request made by the user 51 in control contents when automatic driving is performed next time (step S133). Specifically, the parameter changing unit 26 changes a parameter related to an automatic driving function. As an example of parameter change, a distance with another vehicle is changed to a longer distance. If an answer made by the user 51 is determined to be negative (NO in step S131), a parameter is not changed. The processing in steps S103 to S135 is repeated until the ignition is in an off state.

Figure 10:
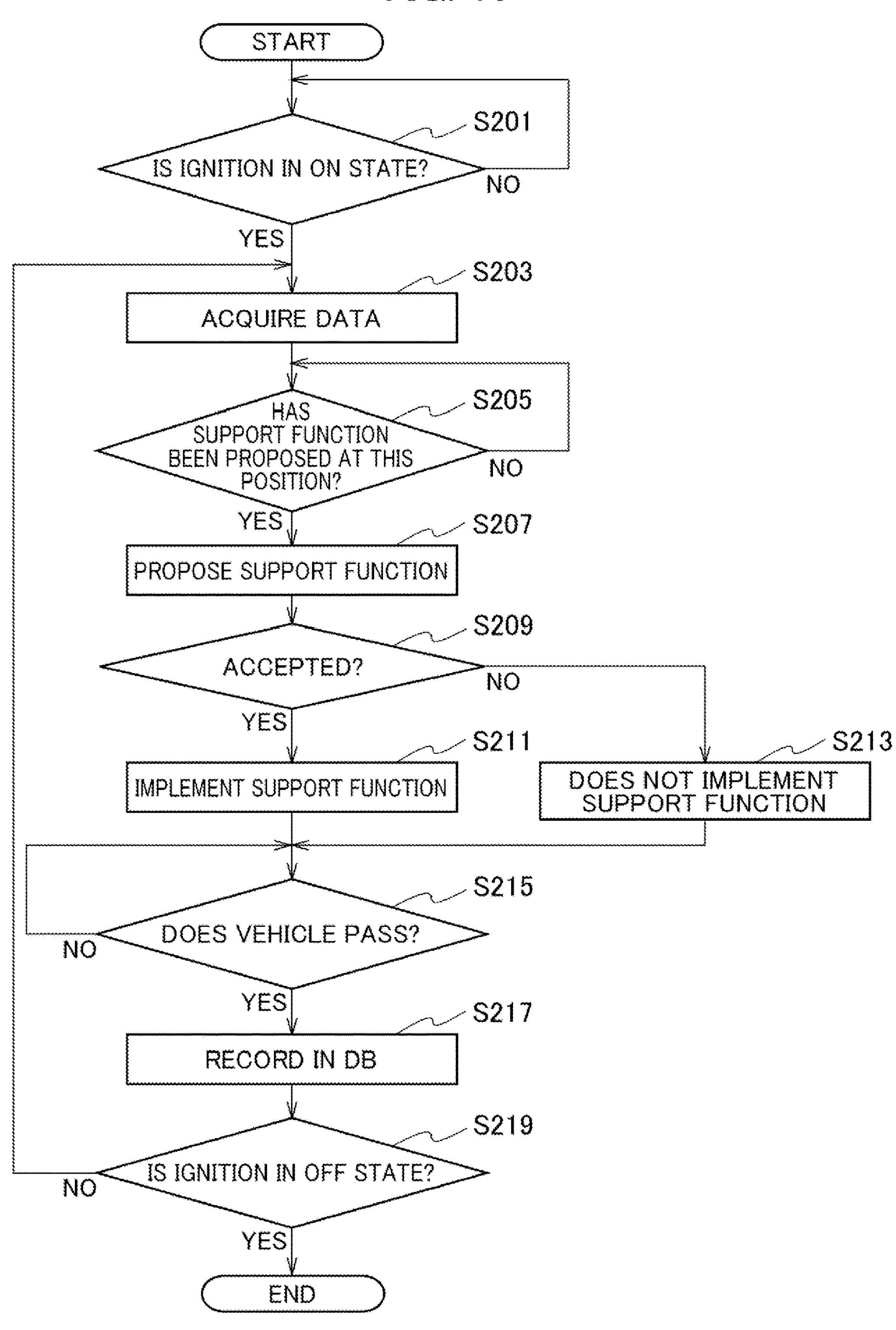
FIG. 10 is a flowchart for explaining an operation example of the driving support device 1.

Next, an operation example of the driving support device 1 will be described with reference to the flowchart of FIG. 10.

When the ignition is in an on state (YES in step S201), the processing proceeds to step S203. In step S203, the proposal unit 33 acquires position information from the position detecting unit 28. In step S205, the proposal unit 33 determines, based on the position information, whether a current position of the vehicle is a position where a support function was proposed last time. The "position where a support function was proposed last time" will be referred to as a "position A". When the current position of the vehicle is the position A (YES in step S205), the support function selecting unit 32 refers to the user database 31 and proposes a support function to the user 51 (step S207). If the user 51 accepts the support function (YES in step S209), the support function implementing unit 34 implements the support function (step S211). If the user 51 does not accept the support function (NO in step S209), the support function implementing unit 34 does not implement the support function (step S213). Data when the vehicle passes the position A (YES in step S215) is recorded in the user database 31 (step S217). The processing in steps S203 to S217 is repeated until the ignition is in an off state.

Actions and Effects

As described above, the following actions and effects can be acquired in accordance with the driving support device 1 according to the present embodiment.

The driving support device 1 includes the sensor 10 for acquiring data of a space inside the vehicle and data of a space outside the vehicle, and the controller 20. The controller 20 determines whether the vehicle is in an abnormal state, based on the data acquired by the sensor 10. If the controller 20 determines that the vehicle is in an abnormal state, the controller 20 outputs a message indicating that the vehicle is in an abnormal state to the user 51 who is on the vehicle. The controller 20 acquires an answer made by the user 51 in response to the message using an input device. An example of an input device is the microphone 11. By providing support according to an answer made by the user 51, it is possible to provide driving support suitable for a feeling of the user 51.

The information that "the vehicle is in an abnormal state" means a situation where there is a possibility of collision or accident of the vehicle. It is sufficient if the "possibility of collision or accident of the vehicle" is determined based only on the data acquired by the sensor 10. It does not matter whether an entity performing driving is the user 51 or an automatic driving function. However, an entity performing driving may be considered as described later.

An answer made by the user 51 relates to a feeling indicating anxiety or danger about the condition of the vehicle.

If the controller 20 determines that an answer made by the user 51 in response to the message indicates the feeling of anxiety or danger, the controller 20 proposes the user to use a support function for supporting the user 51. An example of an answer indicating the feeling of anxiety or danger is the message indicated by reference numeral 61 shown in FIG. 2. As a result, it is possible to provide driving support suitable for a feeling of the user 51.

The controller 20 estimates a cause of occurrence of the abnormal state, based on the data acquired by the sensor 10. If the controller 20 estimates that a cause arises from driving by the user 51, the controller 20 outputs a message for confirming responsibility to the user 51. An example of the message for confirming responsibility is a message "Who is responsible for this?" shown in FIG. 5. If the controller 20 determines that an answer made by the user 51 in response to the message is for admitting the responsibility, the controller 20 proposes the user to use a support function for supporting the user 51. As a result, it is possible to provide driving support that is suitable for a feeling of the user 51. In addition, by causing the user 51 himself/herself to admit the responsibility, it is possible to make the relationship between the user 51 and the vehicle friendly.

The messages include a message for confirming responsibility to the user 51, a message concerning the condition of the vehicle, a message for confirming a feeling of the user 51, or a message for confirming safety of the user 51. An example of the "message for confirming responsibility to the user 51" is a message "Who is responsible for this?" shown in FIG. 5. An example of the "message concerning the condition of the vehicle" is a message "Did you apply a brake too late?" shown in FIG. 5. An example of the "message for confirming a feeling of the user 51" is a message "Were you scared?" shown in FIG. 5. An example of the "message for confirming safety of the user 51" is a message "Did you feel unsafe?" shown in FIG. 5.

An example of the message for confirming responsibility to the user 51 is a message for confirming to the user 51 whether something has happened in the vehicle or in a periphery of the vehicle (see FIG. 5).

If the controller 20 determines that an answer made by the user 51 in response to the message for confirming responsibility indicates that the user does not admit the responsibility, the controller 20 outputs a message indicating that the user 51 is responsible for the situation. This can provide, to the user 51, an opportunity to change his/her attitude.

The controller 20 estimates a cause of occurrence of the abnormal state, based on the data acquired by the sensor 10. If the controller 20 estimates that a cause arises from the automatic driving function, the controller 20 outputs a message for confirming whether the user 51 had a feeling of anxiety. An example of the "message for confirming whether the user 51 had a feeling of anxiety" is a message "Were you scared?" shown in FIG. 5. Accordingly, it is possible to confirm whether the user 51 has a feeling of anxiety to automatic driving.

If the controller 20 determines that an answer made by the user 51 in response to the message for confirming anxiety indicates that the user had a feeling of anxiety, the controller 20 changes setting of a parameter of the automatic driving function. Specifically, the controller 20 changes the parameter of the automatic driving function to the safe side. An example of the parameter change is to increase a distance from another vehicle. As a result, it becomes possible to provide driving support suitable for a feeling of the user 51. In addition, the reliability to automatic driving is enhanced.

Each function described in the above embodiment may be implemented by means of one or more processing circuits. The processing circuit includes a programmed processing device such as a processing device including an electrical circuit. The processing circuit also includes devices such as application specific integrated circuits (ASICs) and circuit components that are arranged to perform the described functions.

As described above, although an embodiment of the present invention has been described, it should not be understood that the arguments and drawings forming part of this disclosure are intended to limit the present invention. Various alternative embodiments, examples, and operational techniques will be apparent to those skilled in the art from this disclosure.

REFERENCE SIGNS LIST

1 Driving support device
10 Sensor
11 Microphone
12 Camera
13 GPS receiver
14 Switch
20 Controller
40 Robot head

The invention claimed is:

1. A driving support device comprising:
a sensor configured to acquire data of a space inside a vehicle and data of a space outside the vehicle; and
a controller,
wherein the controller is configured to:
determine whether the vehicle is in an abnormal state based on the data acquired by the sensor;
upon determining that the vehicle is in the abnormal state, output a first message indicating that the vehicle is in the abnormal state to a user on the vehicle;
acquire a first answer from the user to the first message via an input device;
propose use of a support function for supporting the user based on the first answer from the user to the first message; and
acquire a second answer from the user to the proposed use of the support function via the input device;
wherein the first message includes a message for confirming the responsibility to the user, a message concerning a state of the vehicle, a message for confirming a feeling of the user, or a message for confirming safety of the user; and
wherein, upon determining that the first answer from the user to the first message for confirming the responsibility indicates that the user does not admit the responsibility, the controller is configured to output a second message indicating that the user has the responsibility.

2. The driving support device according to claim 1, wherein the vehicle being in the abnormal state means a situation where there is a possibility of a collision or an accident of the vehicle.

3. The driving support device according to claim 1, wherein the first answer from the user relates to a feeling indicating anxiety or danger about the abnormal state of the vehicle.

4. The driving support device according to claim 1, wherein, upon determining that the first answer from the user to the message indicates anxiety or danger, the controller is configured to propose use of the support function for supporting the user.

5. The driving support device according to claim 4, wherein the controller is configured to:
estimate a cause of occurrence of the abnormal state based on the data acquired by the sensor;
upon estimating that the cause arises from driving by the user, output a message for confirming responsibility to the user; and
upon determining that the first answer from the user to the message indicates that the user admits the responsibility, propose use of the support function for supporting the user.

6. The driving support device according to claim 1, wherein the message for confirming the responsibility to the user is a message for confirming to the user whether something has happened in the vehicle or in a periphery of the vehicle.

7. A driving support method comprising:
acquiring data of a space inside a vehicle and data of a space outside the vehicle;
determining whether the vehicle is in an abnormal state based on the acquired data;
upon determining that the vehicle is in the abnormal state, outputting a first message indicating that the vehicle is in the abnormal state to a user on the vehicle;
acquiring a first answer from the user to the first message via an input device;
proposing use of a support function for supporting the user based on the first answer from the user to the first message; and
acquiring a second answer from the user to the proposed use of the support function via the input device;

wherein the first message includes a message for confirming the responsibility to the user, a message concerning a state of the vehicle, a message for confirming a feeling of the user, or a message for confirming safety of the user; and wherein, upon determining that the first answer from the user to the first message for confirming the responsibility indicates that the user does not admit the responsibility, the controller is configured to output a second message indicating that the user has the responsibility.

8. A driving support device comprising:

a sensor configured to acquire data of a space inside a vehicle and data of a space outside the vehicle; and a controller, wherein the controller is configured to:

determine whether the vehicle is in an abnormal state based on the data acquired by the sensor;

upon determining that the vehicle is in the abnormal state, output a message indicating that the vehicle is in the abnormal state to a user on the vehicle;

acquire an answer from the user to the message via an input device; and propose use of a support function for supporting the user based on the answer from the user to the message, wherein the message includes a message for confirming the responsibility to the user, a message concerning a state of the vehicle, a message for confirming a feeling of the user, or a message for confirming safety of the user, and wherein, upon determining that an answer from the user to the message for confirming the responsibility indicates that the user does not admit the responsibility, the controller is configured to output a message indicating that the user has the responsibility.

9. A driving support method comprising:

acquiring data of a space inside a vehicle and data of a space outside the vehicle;

determining whether the vehicle is in an abnormal state based on the acquired data;

upon determining that the vehicle is in the abnormal state, outputting a message indicating that the vehicle is in the abnormal state to a user on the vehicle;

acquiring an answer from the user to the message via an input device;

proposing use of a support function for supporting the user based on the answer from the user to the message;

wherein the message includes a message for confirming the responsibility to the user, a message concerning a state of the vehicle, a message for confirming a feeling of the user, or a message for confirming safety of the user; and upon determining that an answer from the user to the message for confirming the responsibility indicates that the user does not admit the responsibility, outputting a message indicating that the user has the responsibility.

* * * * *